United States Patent [19]

Nakamura

[11] Patent Number: 5,278,598
[45] Date of Patent: Jan. 11, 1994

[54] CAMERA WITH NON-TTL TYPE FINDER

[75] Inventor: Yoshio Nakamura, Chiba, Japan
[73] Assignee: Ricoh Company, Ltd., Tokyo, Japan
[21] Appl. No.: 964,831
[22] Filed: Oct. 22, 1992

[30] Foreign Application Priority Data

Oct. 31, 1991 [JP] Japan .................... 3-313352

[51] Int. Cl.⁵ .................. G03B 13/20; G03B 13/02
[52] U.S. Cl. .................. 354/166; 354/219; 354/223
[58] Field of Search ........... 354/166, 168, 219, 223, 354/163, 164, 165

[56] References Cited

U.S. PATENT DOCUMENTS 4,268,151  5/1981  Kobori et al. ............. 354/219
5,083,149  1/1992  Kudo et al. ............... 354/402

FOREIGN PATENT DOCUMENTS 61-169825  7/1986  Japan .
2-230226   9/1990  Japan .

*Primary Examiner*—Michael L. Gellner
*Assistant Examiner*—Nicholas J. Tuccillo
*Attorney, Agent, or Firm*—Oblon, Spivak, McClelland, Maier & Neustadt

[57] ABSTRACT

A camera with a non-TTL type finder may avoid a mechanical complexity, may be produced with a gentler standard in dimensional accuracy than conventional cameras of such a type, and may lower consumption of a power battery.

A finder focusing dial is manually rotated together with a cam member to swing an interlocking lever. An end of the interlocking lever moves an objective lens frame back and forth. When it is observed that an image of a target subject becomes focused on a finder focusing screen through a finder eye piece, the rotation of the dial is stopped. A focused state detecting device detects a stop position of an objective lens to supply a detection value to a photo-taking optical system focusing amount determining device to determine an amount of focusing. A drive device drives the photo-taking optical system into an in-focus state in accordance with the focusing amount thus determined.

14 Claims, 9 Drawing Sheets

CAMERA WITH NON-TTL TYPE FINDER

BACKGROUND OF THE INVENTION

1. Field of the Invention

The present invention relates to an improvement in a camera with a non-TTL type finder operatively coupled with a photo-taking optical system.

2. Description of the Related Art

A coupled range finder is well known as a typical example of conventional non-TTL type finder operatively coupled with a photo-taking optical system (photo-taking lens).

The finder of this type is structured, for example as shown in FIG. 9 or 10, such that a feed mechanism of a photo-taking optical system is interlocked by a proper coupling mechanism with a deflector of a coincidence type range finder to complete a focusing operation of the photo-taking optical system when double images of a subject coincide with each other.

A coupled range finder as shown in FIG. 9 is arranged such that a photo-taking optical system (not shown) is fed out by a translation helicoid mechanism (not shown). The deflector is a concave lens 101, which is one of the simplest arrangements. This arrangement can be used either in case of an interchangeable photo-taking optical system or in case of a photo-taking optical system fixedly mounted in a camera.

In the above example, the concave lens 101 as the deflector is mounted at an appropriate position on a swing lever 103, which may swing about a support shaft 102. A free end 104 of the swing lever 103 is in contact with a member 105 directly connected to the translation helicoid mechanism through a biasing force of a biasing spring 106.

The swing lever 103 rotates about the support shaft 102 with a motion of the translation helicoid mechanism in a direction of arrow A upon focusing of the photo-taking optical system. The rotation of the swing lever 103 deviates the concave lens 101 by an amount depending upon the motion of the translation helicoid mechanism in a direction perpendicular to the finder optical axis, whereby achieving a coincidence of double images of a subject.

Another coupled range finder as shown in FIG. 10 is an example in which the deflector is a rotation mirror 111. This arrangement can also be used either in case of the interchangeable photo-taking optical system or in case of the photo-taking optical system fixedly mounted in a camera.

In this example, the rotation mirror 111 as the deflector is mounted at a rotation center of a first lever 113, which swings about a support shaft 112. A free end of the first lever 113 is in contact through a proper gap adjusting mechanism 114 with a contact member 116a provided at an end of a second lever 116, which swings about a support shaft 115.

Transmitted through an interlocking pin 117 to the other end 116b of the second lever 116 is a motion of the translation helicoid mechanism in a direction of arrow A' upon focusing of the photo-taking optical system. The motion of the translation helicoid mechanism is reduced through the second lever 116 to be transmitted to the first lever 113. Then the rotation mirror 111 is rotated by an angle corresponding to the motion of the translation helicoid mechanism, whereby achieving a coincidence of double images of a subject.

Another example of the non-TTL finder is known to display whether a deviation direction of focusing dial manually operated by a user is coincident with a distance measurement result obtained by a so-called active AF (auto-focus).

The coupled range finders have such complex arrangements including a number of constituent members, which need a strict dimension accuracy management, presenting a big problem in structure, in production, and in cost.

The non-TTL type finder using the latter active AF always displays a difference between the distance measurement of the active AF and an indication distance of the focusing dial. Thus, the continuous distance measurement must be carried out, which extremely consumes a power of a battery, presenting a big problem in use.

SUMMARY OF THE INVENTION

The present invention was accomplished in view of the above circumstances.

It is an object of the present invention to provide a camera with a new non-TTL type finder, which may avoid a mechanical complexity, which may be produced with a gentler standard in dimensional accuracy than the conventional ones, and which may lower consumption of a power battery.

The above object of the present invention can be achieved by a camera with a non-TTL type finder, comprising: a finder focusing screen disposed in a finder optical system of the finder to form an image of a subject thereon; a finder focusing optical member located closer to the subject than the finder focusing screen and constituting a part of the finder optical system; a finder focusing device for changing a position of the finder focusing optical member in a direction of an optical axis of the finder optical system relative to the finder focusing screen to focus the image of the subject on the finder focusing screen; a focused state detecting device for detecting the position of the finder focusing optical member in the direction of the optical axis of the finder optical system relative to the finder focusing screen; a photo-taking optical system separately arranged from the finder optical system and being capable of focusing an image of the subject on a record medium; a photo-taking optical system focusing amount determining device for determining an amount of focusing of the photo-taking optical system in dependence on a detection value of the focused state detecting device; and a photo-taking optical system driving device for driving the photo-taking optical system into an in-focus state in accordance with the amount of focusing determined by the photo-taking optical system focusing amount determining device.

In the thus-arranged camera with the non-TTL type finder, the finder optical system of non-TTL type is structured as a finder optical system provided with a finder focusing screen and a finder focusing optical member (finder objective lens) capable of forming a real image of a subject on the finder focusing screen.

Before focusing of the photo-taking optical system, the finder focusing device (finder focusing dial) is operated to focus an image of a subject on the focusing screen. In this state, the focused state detecting device detects either a distance along the finder optical axis between the finder objective lens and the focusing screen or an amount of movement of the finder objective lens along the finder optical axis relative to the focusing screen. A value detected is introduced into the photo-taking optical system focusing amount determining device to determine an amount of focusing of the photo-taking optical system. The photo-taking optical system driving device, for example an electric motor, moves the photo-taking optical system to a position corresponding to the value determined by the photo-taking optical system focusing amount determining device upon shutter release.

The camera with the non-TTL type finder according to the present invention can enjoy a variety of excellent merits and advantages as follows;

(1) The camera with the non-TTL type finder according to the present invention can avoid the mechanical complexity, as compared to the cameras with a conventional non-TTL type finder, and can be produced with a gentler standard in dimension accuracy than the cameras with a conventional non-TTL type finder.

(2) The camera with the non-TTL type finder according to the present invention can reduce the consumption of power battery, as compared to the cameras with a conventional non-TTL type finder.

(3) In a conventional camera with an auto-focus device, if a distance measurement designated position, for example a projection position of infrared light spot, is away from a major subject on a photographic field, there are frequent occasions of an inability of distance measurement or of a resultant photograph out of focus. The camera with the non-TTL type finder according to the present invention can avoid an occurrence of such occasions.

In the camera with the non-TTL type finder as above described, the finder focusing device moves the finder focusing optical member with respect to the finder focusing screen.

In one aspect of the present invention, the focused state detecting device comprises a comb focusing pattern having a plurality of teeth aligned at a predetermined pitch along the finder optical axis, an earth pattern disposed to oppose the focusing pattern, a slide terminal disposed movable with the optical member along the finder optical axis to connect the plural teeth of the focusing pattern in sequence with the earth pattern, and a connection position detecting device for detecting a tooth of the focusing pattern connected with the earth pattern.

In another aspect of the present invention, the focused state detecting device comprises an electric resistance plate disposed along the finder optical axis, a slide terminal disposed movable along the finder optical axis, and a focusing resistance value detecting device for detecting a resistance value of the electric resistance plate determined by a position of the slide terminal.

The finder focusing device moves the finder focusing optical member within a predetermined range along the finder optical axis. The predetermined range is defined by two ends corresponding to an infinite distance and to a closest distance.

The focused state detecting device has a both end detecting device for detecting the both ends of the predetermined range. The both end detecting device comprises an infinite limit display pattern defining a movement limit position on an infinite distance side and a closest limit display pattern defining a movement limit position on a closest distance side.

The finder focusing device comprises an operation member of dial manually operated, a cam member as arranged to change a lift amount depending upon a rotation amount of the operation member, an interlocking member changing a rotation angle in accordance with the lift amount of the cam member, an optical system holding member holding the finder focusing optical member and moving the finder focusing optical member in a predetermined direction from a reference position along the finder optical axis in synchronism with the interlocking member, and a biasing member to bias the optical system holding member in a reverse direction to the predetermined direction.

The photo-taking optical system driving device starts driving the photo-taking optical system by a shutter release operation after the photo-taking optical system focusing amount determining device has determined the focusing amount of the photo-taking optical system.

Further objects and advantages of the present invention will be apparent from the following description of the preferred embodiments of the invention as illustrated in the accompanying drawings.

DESCRIPTION OF THE PREFERRED EMBODIMENTS

There is a structure of a camera with a non-TTL type finer according to the present invention explained in detail in the following in accordance with the accompanying drawings.

Figure 1:
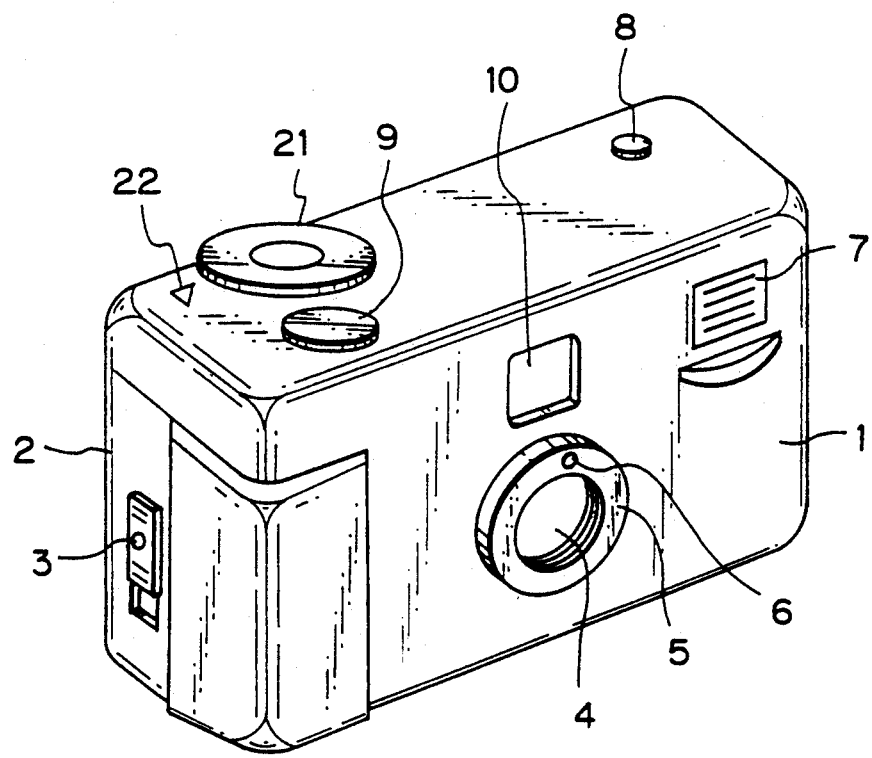
FIG. 1 is a perspective view to show an appearance of a camera with a non-TTL type finder according to the present invention.
Figure 2:
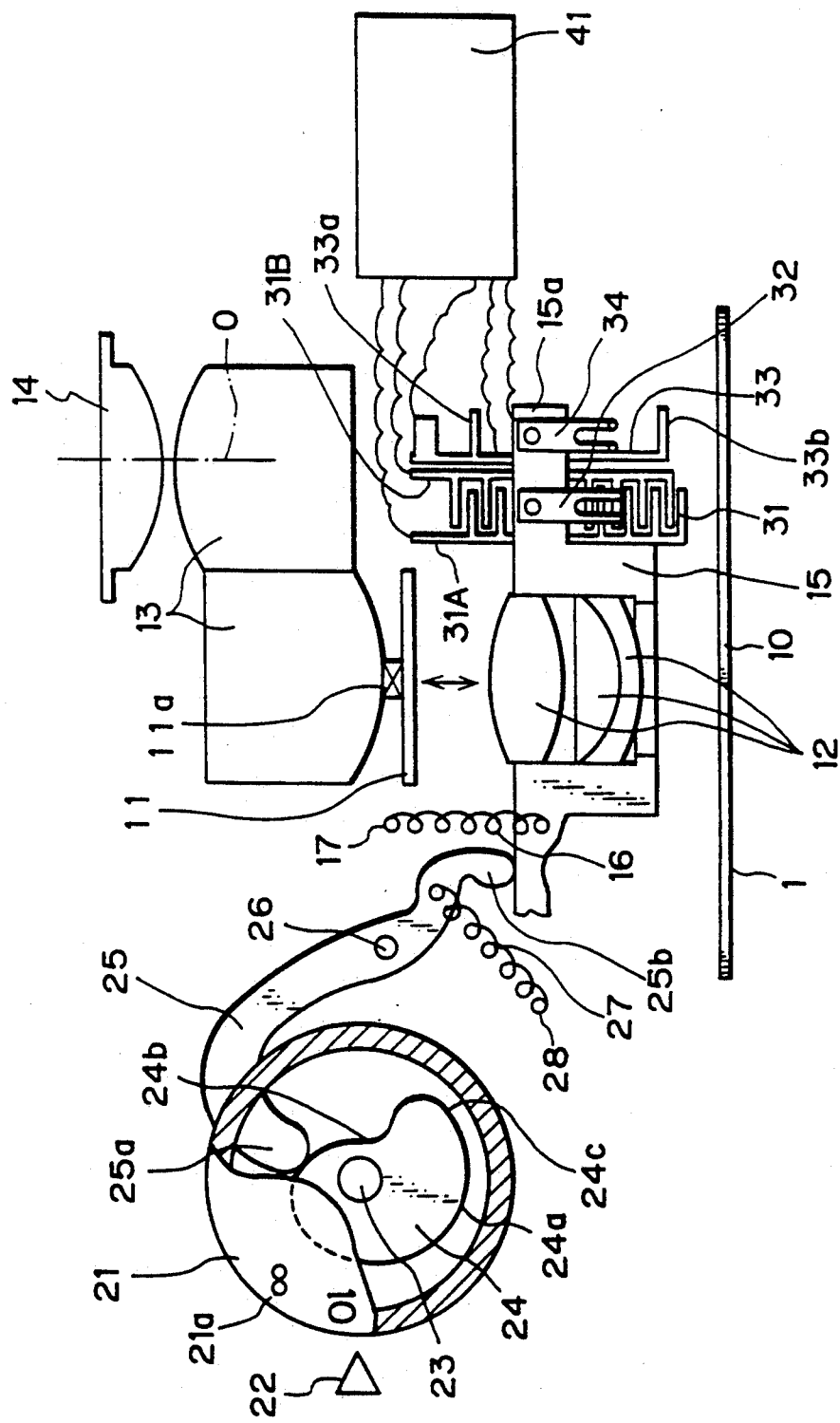
FIG. 2 is a constitutional drawing to schematically show an inside structure of the first embodiment of the camera as shown in FIG. 1.

FIG. 1 is a perspective view to show an appearance of the camera with the non-TTL type finder in the first embodiment according to the present invention, and FIG. 2 is a constitutional drawing to schematically show an inside structure of the camera as shown in FIG. 1 in the first embodiment.

In FIGS. 1 and 2, numeral 1 denotes a camera body with a back panel 2 being hinged at one side to open and close, which can be opened by a back panel opening button 3 disposed on the left side when seen from the front of the camera.

Numeral 4 denotes a photo-taking optical system disposed on a front wall of the camera body 1. The photo-taking optical system 4 may be focused by a lens barrel 5, which is translationally movable back and forth along a photo-taking optical axis.

The lens barrel 5 is structured such that a focusing amount thereof is determined by a photo-taking optical system moving amount determining device 43, that a position of the lens barrel 5 after moved is detected by a photo-taking optical system position detecting device 45, and that it is driven by a judging device 46, a photo-taking optical system drive control device 47, and a photo-taking optical system driving device 48, as will be detailed later.

Numeral 6 designates a photometric lens constituting a part of a light receiving system of a light measuring device 18 as described later. The photometric lens 6 is disposed for example on a front face of the lens barrel 5.

Numeral 7 designates a light emitting portion of a flash light unit 19 as later described, which is disposed at a right upper end in the front wall of the camera body 1.

Numerals 8 and 9 are a power operation button and a shutter release button of camera, respectively, each of which has a well-known structure. The buttons 8, 9 are disposed on the upper wall of the camera body 1, respectively.

Numeral 10 is a finder window of the non-TTL type finder constituting a characteristic portion of the present invention. The finder window 10 is disposed immediately above the lens barrel 5 on the front wall of the camera body 1.

Numerals 11-14 represent a finder optical system constituting the non-TTL type finder. The finder optical system is constituted by a focusing screen 11 made with a ground glass with a split image prism 11a at a center thereof, a finder objective lens 12 as a finder focusing optical member disposed in a finder optical path in front of the focusing screen 11 (closer to a subject than the focusing screen 11), a pair of image inversion prisms 13 disposed in the finder optical path behind the focusing screen 11, and a finder eye piece 14 disposed in the finder optical path behind the image inversion prisms 13.

The focusing screen 11 and the image inversion prisms 13 are fixedly disposed by proper means in the camera body 1. The finder eye piece 14 is so arranged as to move back and forth in a predetermined range along the finder optical axis 0 while held in an unrepresented eye piece frame to allow a user to adjust a diopter.

Further, the finder objective lens 12 is so arranged as to move back and forth along the finder optical axis 0 to form a real image of a subject located in a photographic range on the focusing screen 11.

Numeral 15 denotes an objective lens frame as an optical system holding member to hold the finder objective lens 12. The objective lens frame 15 has a jaw 15a on the rear end side thereof. The objective lens frame 15 may translationally move back and forth along the finder optical axis 0 by means of a proper translation guide device not shown.

Numeral 16 denotes a first biasing spring as a biasing member to give the objective lens frame 15 such an attribute as to always move toward the focusing screen 11. The fixed end of the first biasing spring 16 is supported by a first support pin 17 implanted into the camera body 1, whereby the spring 16 extends between the objective lens frame 15 and the first support pin 17.

Figure 3:
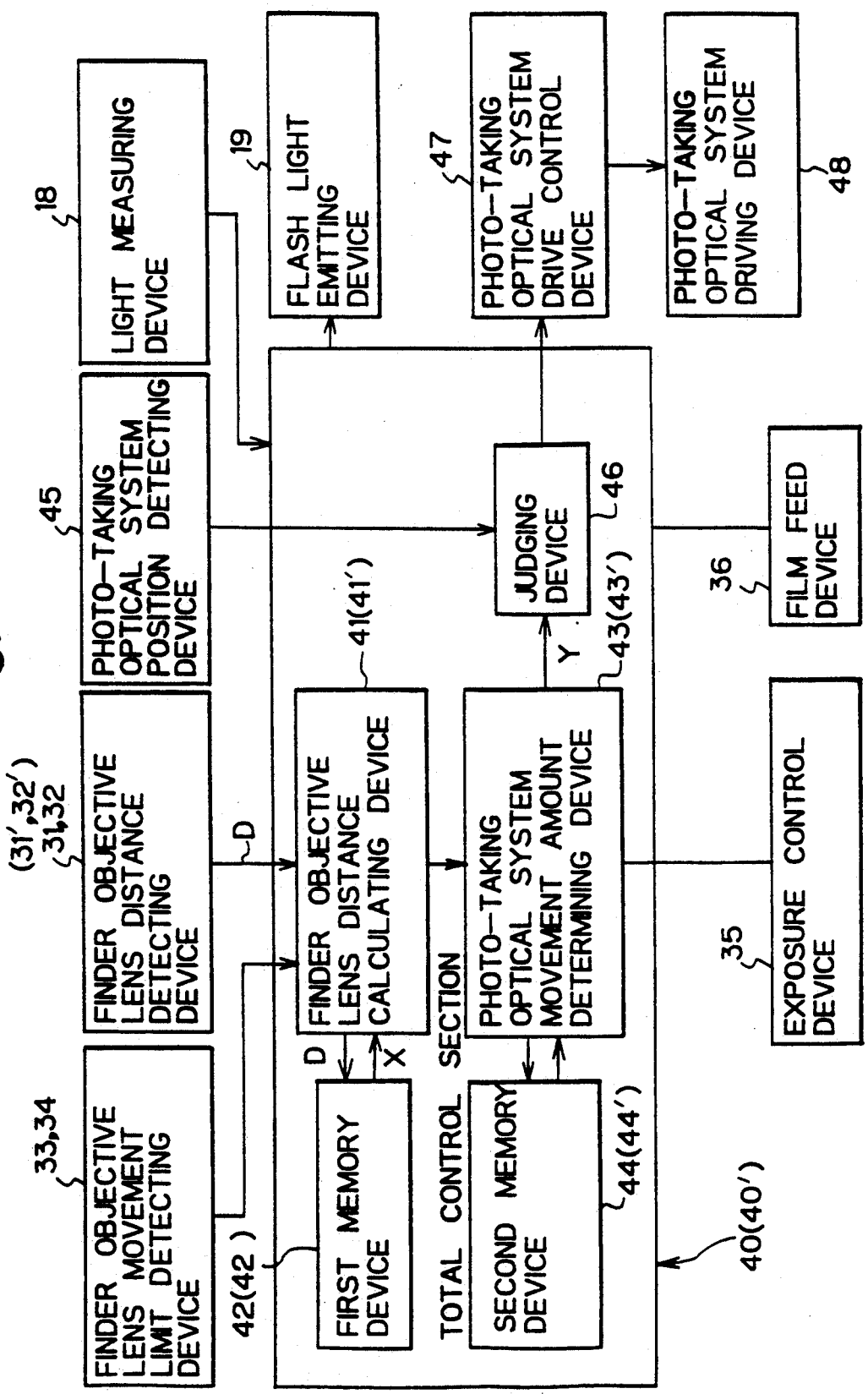
FIG. 3 is a circuit diagram to show a structure of an electric control system to control the first embodiment having the structure of FIG. 2.

Numerals 18 and 19 are a light metering device and a flash light unit, respectively, of well known structure, which are disposed in the camera body 1 (see FIG. 3).

Numeral 21 is a finder focusing dial to bring the finder objective lens 12 into an in-focus state with respect to the focusing screen 11. The finder focusing dial 21 is rotatably disposed on the upper wall of the camera body 1.

A subject distance indication division 21a is formed in circle on a surface of the finder focusing dial 21 to indicate a distance of a subject. A reading index 22 is disposed on the upper wall of the camera body 1 near the finder focusing dial 21 as the finder focusing device, so that a current subject distance may be indicated thereby.

Numeral 23 denotes a dial operation shaft disposed rotatable together with the finder focusing dial 21. A finder focusing cam member 24 is fixed on an outer periphery of the dial operation shaft 23 to rotate together with the finder focusing dial 21 and the dial operation shaft 23.

The finder focusing cam member 24 includes a control cam 24a on an outer periphery thereof. The control cam 24a has a lift amount to move the objective lens frame 15 (as well as the finder objective lens 12) back and forth along the finder optical axis 0.

A minimum radius part 24b of the control cam 24a is arranged to have a radius (minimum lift amount) to bring the objective lens frame 15 to a position on the finder optical axis 0 where an image of a subject positioned at an infinite distance may be focused on the focusing screen 11 by the finder objective lens 12. Whereas, a maximum radius part 24c of the control cam 24a is arranged to have a radius (maximum lift amount) to bring the objective lens frame 15 to a position along the finder optical axis 0 where an image of a subject located at a closest possible distance to be photographed may be focused on the focusing screen 11 by the finder objective lens 12.

A middle part (not numbered) of the control cam 24a between the minimum radius part 24b and the maximum radius part 24c is arranged to have a radius (one of stepwise intermediate lift amounts) to bring the objective lens frame 15 to a position along the finder optical axis 0 where an image of a subject located at one of plural subject distances preliminarily determined within a range between the infinite distance and the closest distance may be focused on the focusing screen 11 by the finder objective lens 12.

Numeral 25 denotes an interlocking lever as an interlocking member rotatably journalled on a support shaft 26. One end 25a of the interlocking lever 25 is in contact with the control cam 24a of the finder focusing cam member 24, and the other end 25b of the finder focusing cam member 24 is in contact with a rear end face of the aforementioned jaw 15a of the objective lens frame 15.

Numeral 27 is a second biasing spring to make the other end 25b of the interlocking lever 25 pressed to contact with the jaw 15a of the objective lens frame 15. A fixed end thereof is supported by a second support pin 28 implanted into the camera body 1, so that the second biasing spring extends between the interlocking lever 25 and the second support pin 28.

A biasing force of the second biasing spring 27 is set weaker than that of the aforementioned first biasing spring 16.

Numeral 31 denotes a distance detection pattern for stepwise detection of a gap (distance) between the focusing screen 11 and the objective lens frame 15 along the finder optical axis 0. The distance detection pattern 31 is composed of a combination of two comb teeth like conductive patterns 31A and 31B substantially symmetric with each other and opposing to each other.

The distance detection pattern 31 is disposed in the camera body 1 along the finder optical axis 0.

Numeral 32 denotes a first slide brush as a slide terminal mounted on the jaw 15a of the objective lens frame 15. A free end of the first slide brush 32 intermittently slide-contacts with each of the comb teeth of the comb teeth like conductive patterns 31A, 31B of the distance detection pattern 31 while the objective lens frame 15 moves back and forth along the finder optical axis 0.

The distance detection pattern 31 and the first slide brush 32 constitute the finder objective lens distance detecting device in the first embodiment according to the present invention.

Numeral 33 denotes a movement limit detection pattern to detect a movement limit of the objective lens frame 15 (as well as the finder objective lens 12). The movement limit detection pattern 33 is composed of a conductive pattern having an infinite limit display pattern 33a defining a movement limit position on the infinite distance side and a closest limit display pattern 33b defining a movement limit on the closest distance side. The movement limit detection pattern 33 is disposed in the camera body 1 as in parallel with the distance detection pattern 31.

Numeral 34 denotes a second slide brush mounted in parallel with the first slide brush 32 on the jaw 15a of the objective lens frame 15. A free end of the second slide brush 34 slide-contacts with either of the limit display patterns 33a, 33b of the movement limit detection pattern 33 while the objective lens frame 15 moves back and forth along the finder optical axis 0. A fixed end of the second slide brush 34 is properly earthed to the camera body 1.

The movement limit detection pattern 33 and the second slide bush 34 constitute the finder objective lens movement limit detecting device in the first embodiment according to the present invention.

The finder objective lens movement limit detecting device 33, 34 is provided to prevent the photo-taking optical system 4 (lens barrel 5) from moving over the limits. Thus, a movement limit signal of the objective lens frame 15 from a finder objective lens distance calculating device 41 as later described is output for example to the photo-taking optical system drive control device 47.

Numerals 35 and 36 denote an exposure control device and a film feed device disposed in the camera body 1, each of which is structured as means having an appropriate well-known structure (see FIG. 3).

FIG. 3 is a circuit diagram to show a structure of an electric control system to control the thus-arranged elements of from the camera body 1 to the second slide brush 34.

In FIG. 3, numeral 40 denotes a total control section to execute a total control of the first embodiment of the camera. The total control section 40 is constituted as a control unit having various control device necessary for sequences in the first embodiment as described below, including a photo-taking sequence, a photo-taking optical system drive sequence, and a flash light emission sequence, which are generally needed, with an appropriate exposure calculating device (not shown).

Numeral 41 denotes a finder objective lens distance calculating device connected to the distance detection pattern 31 and to the movement limit detection pattern 33 as described above. The finder objective lens distance calculating device 41 arithmetically obtains a position of a comb tooth with respect to a reference position, which corresponds to a focusing distance between the focusing screen 11 and the objective lens frame 15 (ultimately, the finder objective lens 12) in the distance detection pattern 31. The finder objective lens distance calculating device 41 may judge a direction of movement of the objective lens frame 15. In the first embodiment, the reference position is set at a position of the objective lens frame 15 corresponding to the infinite distance.

Further, the finder objective lens distance calculating device 41 is arranged to output a movement limit signal of the objective lens frame 15 based on an output from the finder objective lens movement limit detecting device 33, 34.

Numeral 42 denotes a first memory device, which preliminarily stores a table of data $D_1 - D_n$ of gap value (distance value) between the focusing screen 11 and the finder objective lens 12 corresponding to a plurality of subject distances preset within a range between the infinite distance and the closest distance. When a comb tooth position signal D is input from the finder objective lens distance calculating device 41 into the first memory device 42, the first memory device 42 outputs a gap value datum X corresponding to the comb tooth position signal $D_1 - D_n$ to the finder objective lens distance calculating device 41.

When a movement limit signal is input from the finder objective lens movement limit detecting device 33, 34 into the finder objective lens distance calculating device 41, the first memory device outputs either a gap value datum corresponding to the infinite distance or a gap value datum corresponding to the closest distance.

Numeral 43 denotes a photo-taking optical system movement amount determining device connected to the finder objective lens distance calculating device 41, which cooperates with a second memory device 44 as below described to determine a focusing amount Y of the photo-taking optical system 4 (as well as the lens barrel 5) in accordance with a subject distance at that moment.

Numeral 44 is a second memory device, which stores a table of focusing amount Y of the photo-taking optical system 4 corresponding to the gap value (distance value) data X between the focusing screen 11 and the finder objective lens 12 in turn corresponding to the plural subject distances preliminarily set within the range between the infinite distance and the closest distance. When a comb tooth position signal is input from the finder objective lens distance calculating device 41, the second memory device 44 outputs a focusing amount Y corresponding to the comb tooth position signal to the photo-taking optical system movement amount determining device 43.

Numeral 45 is a photo-taking optical system position detecting device to detect a position of the photo-taking optical system 4 (as well as the lens barrel 5) along the photo-taking optical axis, which is provided in the camera body 1 near the lens barrel 5 as a proper position detecting device having a well-known structure.

Numeral 46 denotes a judging device connected to the photo-taking optical system movement amount determining device 43 and to the photo-taking optical system position detecting device 45. The judging device 46 monitors to compare the focusing amount Y of the photo-taking optical system 4 determined by the photo-taking optical system movement amount determining device 43 with an actual moving position of the photo-taking optical system 4 detected by the photo-taking optical system position detecting device 45. Numeral 47 denotes a photo-taking optical system drive control device operated by a photo-taking optical system device sequence of the total control section 40. The photo-taking optical system drive control device 47 may control the photo-taking optical system driving device 48 under the comparison monitor of the judging device 46. The photo-taking optical system driving device 48 may be for example a stepping motor.

In the first embodiment, each device of from the finder objective lens distance calculating device 41 to the photo-taking optical system driving device 48 turns into an operating state based on a signal of press operation on the shutter release button 9.

The operation of the thus-arranged camera 1-48 is explained in the following.

The power operation button 8 is first pressed to turn the circuits of the camera into the operation state. Viewing through the finder eye piece 14, a photographer turns the finder focusing dial 21 clockwise for example to move the objective lens frame 15 (finder object lens 12) located at the position corresponding to the infinite distance toward a subject so as to form an image of the subject on the focusing screen 11.

When the finder focusing dial 21 is rotated clockwise, the finder focusing cam member 24 simultaneously rotates clockwise through the dial operation shaft 23. The clockwise rotation of the finder focusing cam member 24 lifts up the one end 25a of the interlocking lever 25 for example in contact with the minimum radius portion 25b of the control cam 24a by a lift amount depending upon a rotation operation amount of the control cam 24a.

The interlocking lever 25 rotates clockwise about the support shaft 26, so that the other end 25b thereof pushes the jaw 15a of the objective lens frame 15 to move the objective lens frame 15 toward the subject along the finder optical axis 0 against the biasing force of the first biasing spring 16.

By that, a gap between the finder objective lens 12 and the focusing screen 11 changes to form a sharp image of the target subject on the focusing screen 11 during the movement process of the objective lens frame 15. The first slide brush 32 disposed on the objective lens frame 15 slides on the two comb teeth like conductive patterns 31A, 31B of the distance detection pattern 31 while intermittently contacting with the teeth thereof, and stops at a position where the sharp image of the subject is formed on the focusing screen 11.

Step S1

Figure 4:
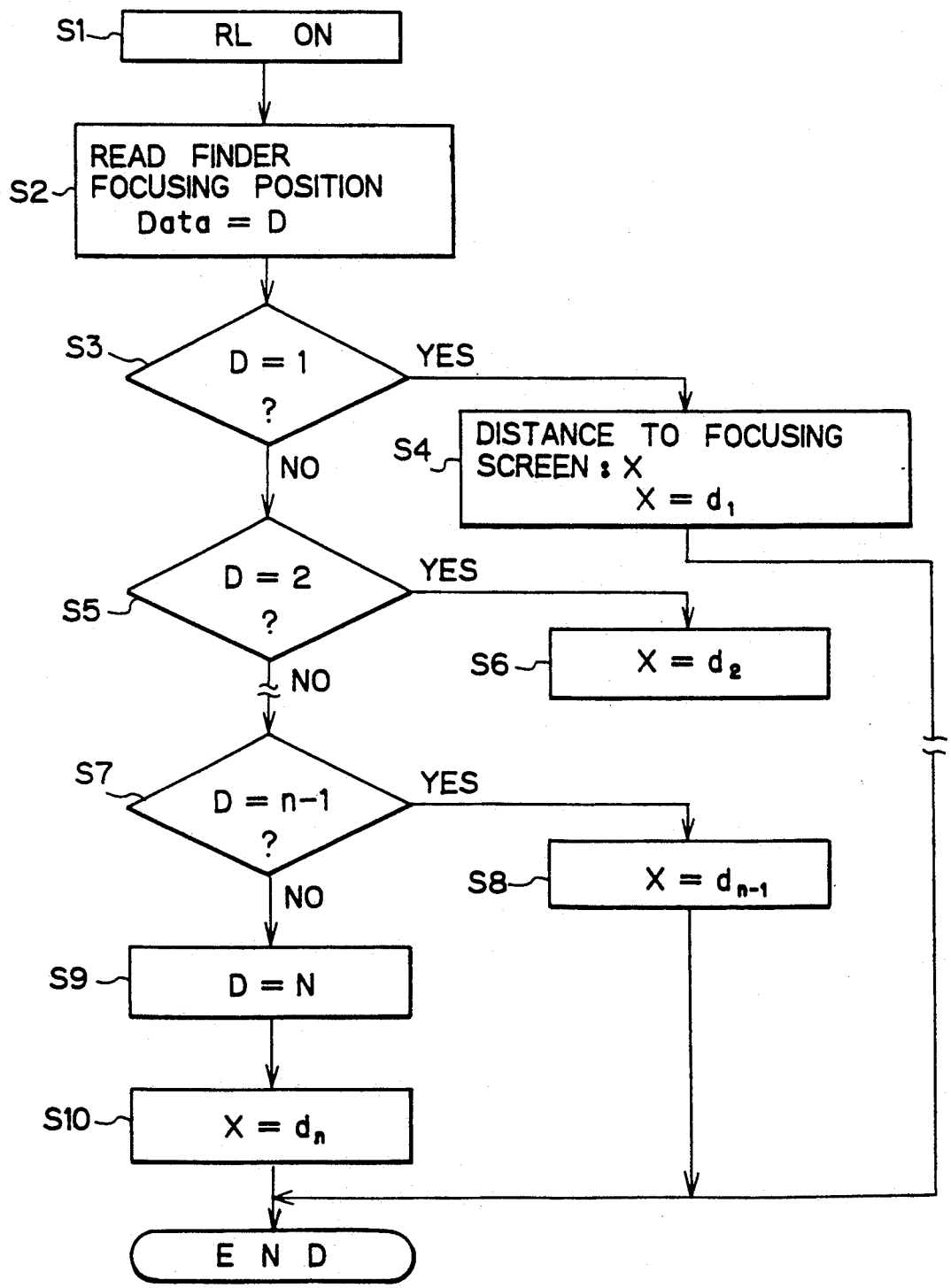
FIG. 4 is a flowchart to illustrate a distance detection operation between a focusing screen and an objective lens frame (finder objective lens) in the first embodiment with the structure of FIG. 2.

At this stage, if a suer stops the operation of the finder focusing dial 21 and presses the shutter release button 9, an operation is started to detect a gap between the focusing screen 11 and the objective lens frame 15 (ultimately the finder objective lens 12) as shown in the flowchart of FIG. 4. This operation is referred to as a gap detection operation.

Step S2

When the gap detection operation is started, a comb tooth position signal D is output from the finder objective lens distance detecting device 31, 32 to the finder objective distance calculating device 41. It is judged in the finder objective lens distance calculating device 41 whether the first slide brush 32 stops at the first comb tooth, that is, whether $D=1$.

Steps S3 and S4

If the first slide brush 32 stops at the first comb tooth ($D=1$), a gap datum $X=d_1$ therefor between the focusing screen 11 and the objective lens frame 15 is read out from the table of the first memory device 42 to the finder objective lens distance calculating device 41. Then the gap detection operation is finished between the focusing screen 11 and the objective lens frame 15 with regard to the first comb tooth position ($D=1$).

Step S5

Unless the stop position of the first slide brush 32 is the first comb tooth position (or if $D\neq 1$), it is then judged whether the stop position of the first slide brush 32 is the second comb tooth position, that is, whether $D=2$.

Step S6

If the first slide brush 32 stops at the second comb tooth position ($D=2$), a gap datum $X=d_2$ therefor between the focusing screen 11 and the objective lens frame 15 is read out from the table of the first memory device 42 to the finder objective lens distance calculating device 41. Then the gap detection operation is finished between the focusing screen 11 and the objective lens frame 15 with regard to the second comb tooth position ($D=2$).

Step S7

Unless the stop position of the first slide brush 32 is the second comb tooth position (or if $D\neq 2$), the finder objective lens distance calculating device 41 repeats the gap detection operation similarly up to the $(n-1)$-th comb tooth position ($D=n-1$) in succession.

Step S8

If the first slide brush 32 stops at the $(n-1)$-th comb tooth position ($D=n-1$), a gap datum $X=d_{n-1}$ therefor between the focusing screen 11 and the objective lens frame 15 is read out from the table of the first memory device 42 to the finder objective lens distance calculating device 41. Then the gap detection operation is finished between the focusing screen 11 and the objective lens frame 15 with regard to the $(n-1)$-th comb tooth position ($D=n-1$).

Steps S9 and S10

In case that the first slide brush 32 is not located at the $(n-1)$-th comb tooth position (or if $D\neq n-1$), the first slide brush 32 must be located at the position corresponding to the closest distance. The finder objective lens distance calculating device 41 deems that the first slide brush 32 is located at the $n$-th comb tooth position ($D=n$). A gap datum $X=d_n$ therefor between the focusing screen 11 and the objective lens frame 15 is read out from the table of the first memory device 42 to the finder objective lens distance calculating device 41. Then the gap detection operation is finished.

In the gap detection operation, if the first slide brush 32 is located between the first comb tooth position (D=1) and the (n−1)-th comb tooth position (D=n−1), the finder objective lens movement limit detecting device 33, 34 effects no movement limit function of the objective lens frame 15. Whereas, the finder objective lens movement limit detecting device 33, 34 effects the movement limit function of the objective lens frame 15 when the first slide brush 32 is located either at the reference position (D=0) corresponding to the infinite distance or at the comb tooth position (D=n) corresponding to the closest distance, inhibiting the movement of the first slide brush 32 (that is, the objective lens frame 15) over these positions (D=0 and D=n).

After the gap datum (a specific value between $X=d_1$ and $X=d_n$) is determined between the focusing screen 11 and the objective lens frame 15 with regard to a subject to be photographed, the total control section 40 generates a command to drive the lens barrel 5 toward the devices of from the photo-taking optical system movement amount determining device 43 to the photo-taking optical system driving device 48.

Figure 5:
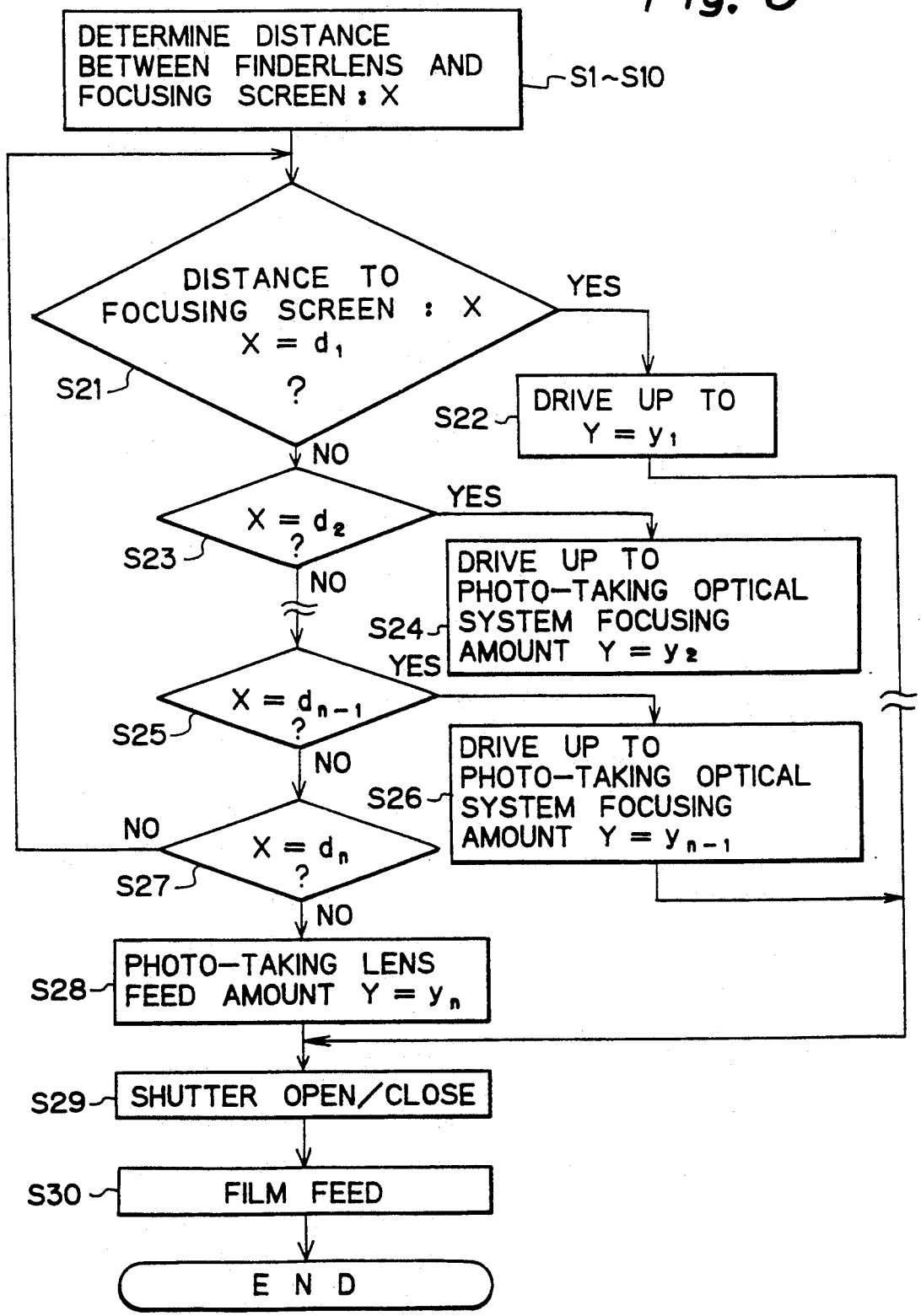
FIG. 5 is a flowchart to illustrate a focusing operation of a photo-taking optical system in the first embodiment with the structure of FIG. 2.

FIG. 5 is a flowchart to illustrate a focusing operation of the photo-taking optical system 4.

When the command is generated from the total control section 40, the photo-taking optical system movement amount determining device 43 reads, based on the gap datum (a specific value between $X=d_1$ and $X=d_n$) given from the finder objective lens distance calculating device 41, a focusing amount Y of the photo-taking optical system 4 corresponding to the specific gap datum from the table of the second memory device 44, and moves the lens barrel 5 by the focusing amount Y from the start position toward the subject.

Steps S21 and S22

Supposing that a specific datum, for example $X=d_{n-1}$, is input as a gap datum corresponding to the outstanding subject distance from the finder objective lens distance calculating device 41, the photo-taking optical system movement amount determining device 43 first executes a judgement about whether the specific gap datum $X=d_{n-1}$ is the gap datum $X=d_1$ between the focusing screen 11 and the objective lens frame 15 with regard to the first position as described above, that is about whether $X=d_1$.

Steps S23 and S24

Since $d_{n-1} \neq d_1$ in this case, the photo-taking optical system movement amount determining device 43 then executes a judgement about whether the specific gap datum $X=d_{n-1}$ is the gap datum $X=d_2$ between the focusing screen 11 and the objective lens frame 15 with regard to the second position, that is, about whether $X=d_2$.

Steps S25 and S26

Since $d_{n-1} \neq d_2$ in this case, the photo-taking optical system movement amount determining device 43 further executes a judgement about whether the specific gap datum $X=d_{n-1}$ is the gap datum $X=d_{n-1}$, that is, about whether $X=d_{n-1}$.

When it is judged that $X=d_{n-1}$, the photo-taking optical system movement amount determining device 43 reads a focusing amount $Y=y_{n-1}$ of the photo-taking optical system 4 corresponding to the specific gap datum $X=d_{n-1}$ from the table of the second memory device 44, and outputs this value as a focusing amount for the target subject to the judging device 46.

If the specific gap datum is $X=d_{n-1}$, a comparison is not carried out between the specific gap datum $X=d_{n-1}$ and the remaining gap datum $X=d_n$ of the closest distance, that is, the next step about whether $X=d_n$ is omitted. Therefore, Step S27 is absent in this example.

The judging device 46, which received the focusing amount $Y=y_{n-1}$ from the photo-taking optical system movement amount determining device 43, drives the photo-taking optical system driving device 48 through the photo-taking optical system drive control device 47 to move the lens barrel 5 by the focusing amount $Y=y_{n-1}$ from the start position (for example the position corresponding to the infinite distance) toward the subject.

During the drive, the total control section 40 simultaneously operates the photo-taking optical system position detecting device 45 to detect a changing position of the lens barrel 5 for feedback of the detection result to the judging device 46. When the photo-taking optical system position detecting device 45 detects that the lens barrel 5 reaches the outstanding focusing amount $Y=y_{n-1}$ of the photo-taking optical system 4, the judging device 46 then quickly stops the photo-taking optical system driving device 48 through the photo-taking optical system drive control device 46.

Step S26

The lens barrel 5 stops at a position after it moves by the desired focusing amount $Y=y_{n-1}$ accordingly. In other words, the photo-taking optical system is in an in-focus state on the target subject. Further, the subject distance may be read with the subject distance indication division 21a on the finder focusing dial 21 and with the reading index 22.

Steps S29 and S30

After the focusing operation of the lens barrel 5 is thus finished, the total control section 40 actuates the exposure control device 35 in accordance with the photo-taking sequence for opening and closing the shutter. After the exposure operation, the total control section 40 operates the film feed device 36 to transfer a next frame non-photographed up to an exposure opening position.

All the operations of the first embodiment are finished with the completion of the film feed operation.

Figure 6:
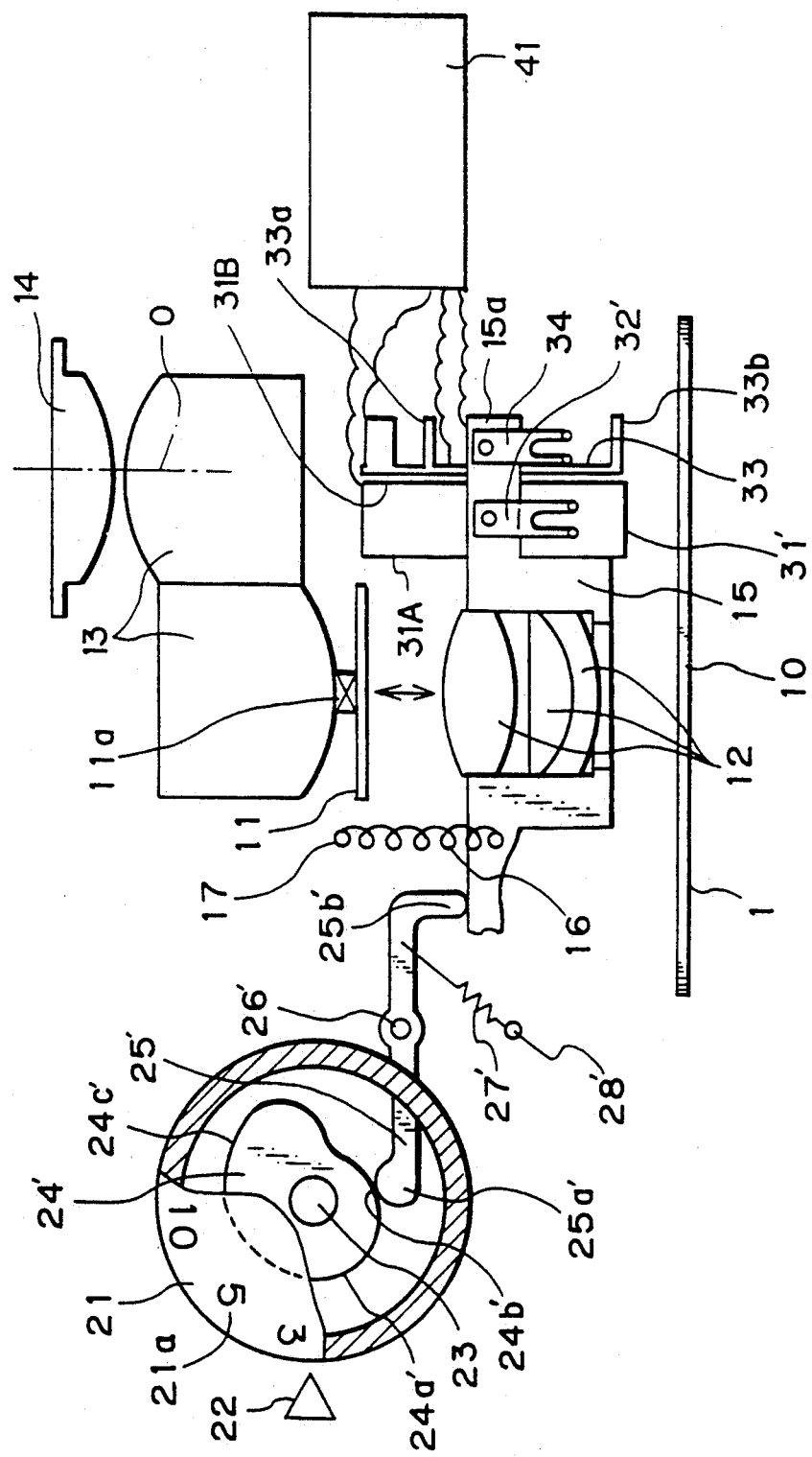
FIG. 6 is a constitutional drawing to schematically show an inside structure of the second embodiment of the camera as shown in FIG. 1.
Figure 7:
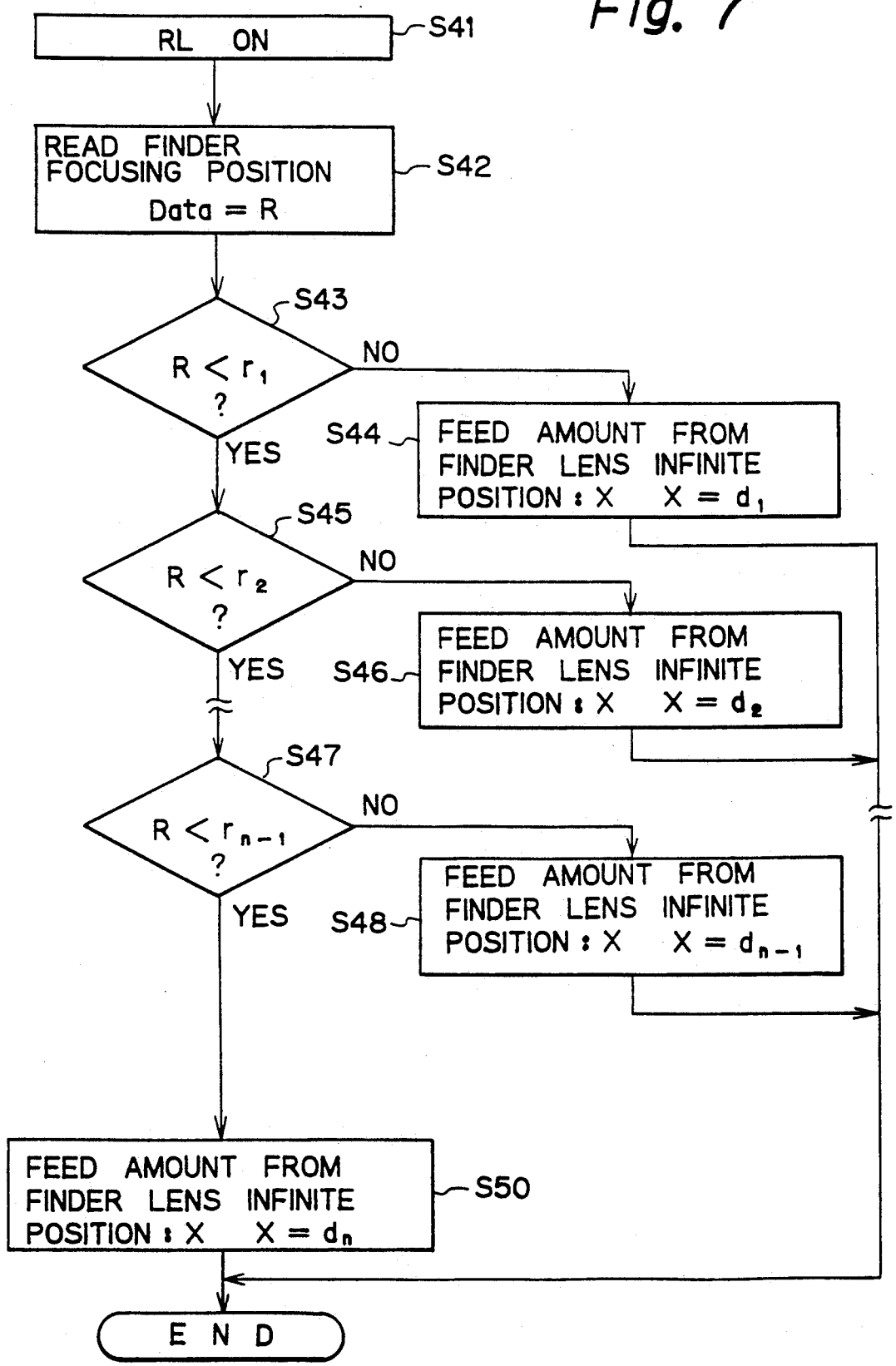
FIG. 7 is a flowchart to illustrate a movement amount detection operation of an objective lens frame (finder objective lens) in the second embodiment with the structure of FIG. 6.
Figure 8:
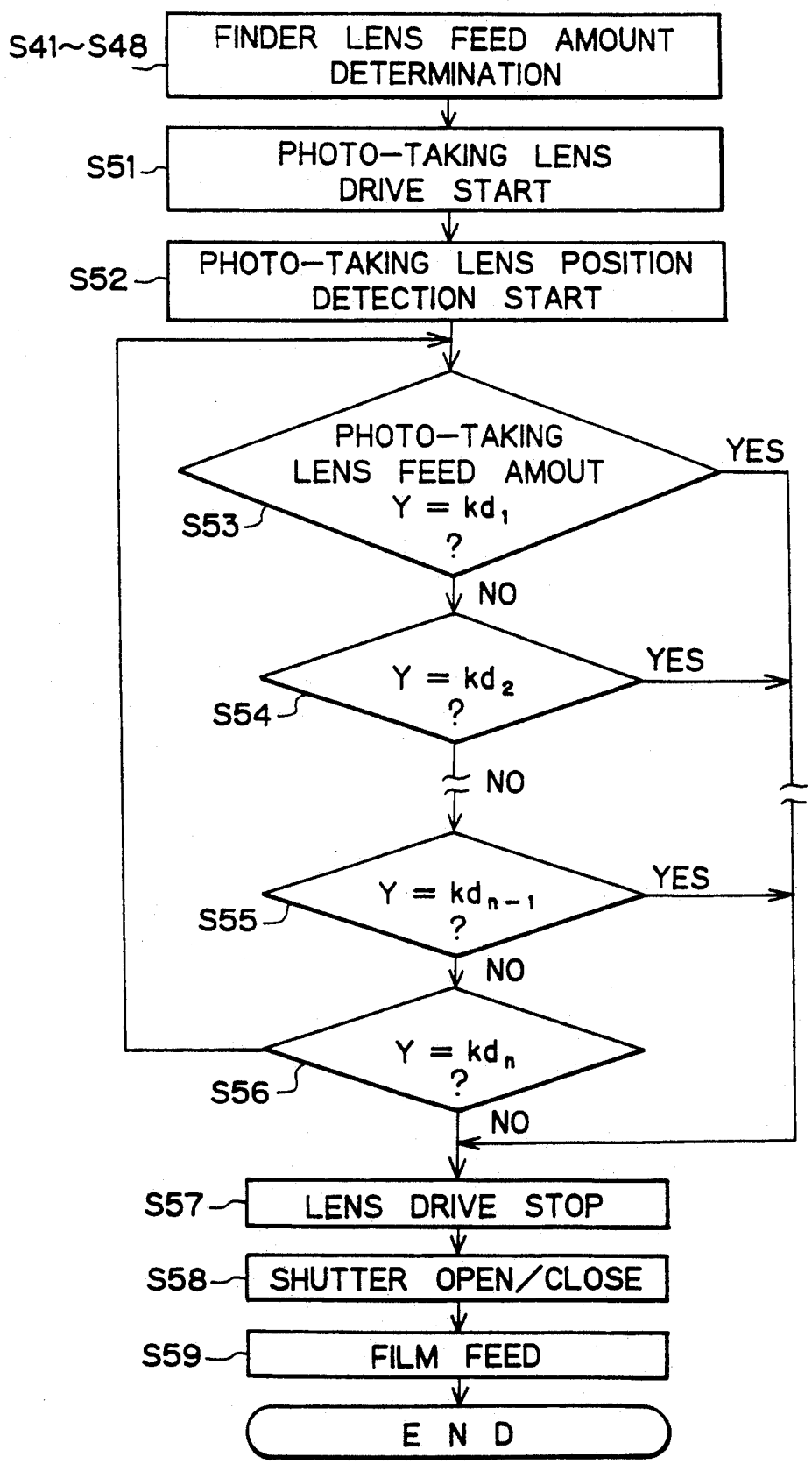
FIG. 8 is a flowchart to illustrate a focusing operation of a photo-taking optical system in the second embodiment with the structure of FIG. 6.
Figure 9:
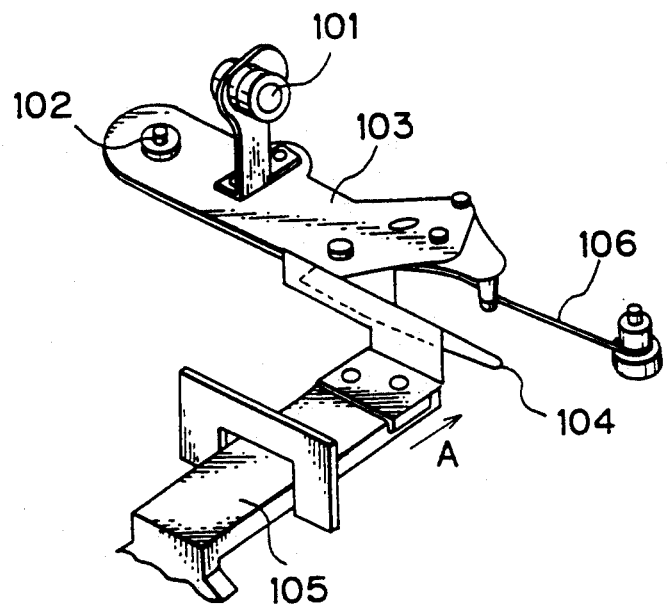
FIG. 9 is a perspective view to illustrate a structure of a coupled range finder as a typical example of the conventional non-TTL type finders.
Figure 10:
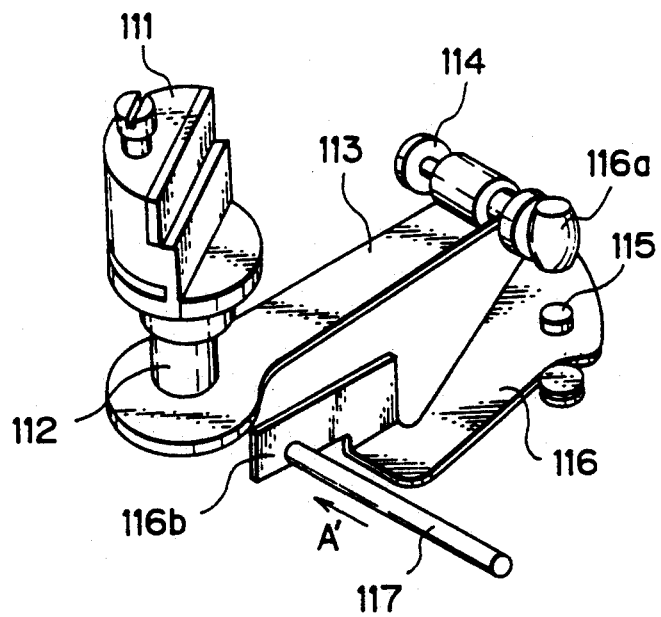
FIG. 10 is a perspective view to illustrate a structure of another coupled range finder as another typical example of the conventional non-TTL type finders.

FIGS. 6-8 show the second embodiment according to the present invention. In the second embodiment, a camera body comprises the elements of from the camera body 1 to the dial operation shaft 23 and of from the movement limit detection pattern 33 to the film feed device 36 common to that of the first embodiment as described above.

In the following description of structure, there are explained only elements and members different from those in the first embodiment to avoid redundancy, and the description of structure will be omitted for the common elements and members in structure.

Numeral 24' denotes a finder focusing cam member used in the second embodiment. A control cam 24a' is formed on an outer periphery of the finder focusing cam member 24', which is different in shape from that of the first embodiment. The control cam 24a' has a lift amount to move the objective lens frame 15 (as well as the finder objective lens 12) back and forth along the finder optical axis 0. A minimum radius portion 24b' of the control cam 24a' is set as to have a radius (minimum lift amount) to achieve a position of the objective lens frame 15 along the optical axis 0 where an image of a subject located at the closest distance may be focused by the finder objective lens 12 on the focusing screen 11. Also, a maximum radius portion 24c' of the control cam 24a' is set as to have a radius (maximum lift amount) to achieve a position of the objective lens frame 15 along the optical axis 0 where an image of a subject located at the infinite distance may be focused by the finder objective lens 12 on the focusing screen 11.

A middle portion (not numbered) of the control cam surface 24a' between the minimum radius portion 24b' and the maximum radius portion 24c' is set as to have a radius (one of stepwise intermittent lift amounts) to achieve a position of the objective lens frame 15 along the optical axis 0 where an image of a subject located at either of plural subject distances preliminarily determined within a range between the closest distance and the infinite distance may be focused by the finder objective lens 12 on the focusing screen 11. Numeral 25' denotes an interlocking lever of the second embodiment rotatably journalled on a support shaft 26'. One end 25a' of the interlocking lever 25' is in contact with the control cam surface 24a' of the finder focusing cam member 24', and the other end 25b' thereof is in contact with a rear end face of the jaw 15a of the objective lens frame 15.

Numeral 27' represents a second biasing spring of the second embodiment to make the both ends 25a', 25b' of the interlocking lever 25' in press contact with the jaw 15a of the objective lens frame 15 and with the control cam 24a'. A fixed end of the second biasing spring 27' is supported by a second support pin 28' implanted into the camera body 1, whereby the second biasing spring extends between the interlocking lever 25' and the second support pin 28'.

A biasing force of the second biasing spring 27' is set stronger than that of the first biasing spring 16, different from the arrangement in the first embodiment.

Numeral 31' designates an electric resistance plate to detect a movement amount of the objective lens frame 15 along the finder optical axis 0, which is disposed in the camera body 1 along the finder optical axis 0.

Numeral 32' designates a first slide brush of the second embodiment mounted on the jaw 15a of the objective lens frame 15. A free end of the first slide brush 32' always slides on the electric resistance plate 31' while contacting therewith, and a fixed end thereof is earthed to the camera body 1.

The electric resistance plate 31' and the first slide brush 32' constitute the finder objective lens movement amount detecting device in the second embodiment.

An electric control system for controlling the camera of the second embodiment is structured to have the elements of from the photo-taking optical system position detecting device 45 to the photo-taking optical system driving device 48, which are common to the first embodiment, but to have other control devices as shown in parentheses in FIG. 3.

In detail, numeral 40' is a total control section for total control of the camera of the second embodiment. The total control section 40' is structured as a control unit to have various control devices necessary for sequences in the second embodiment including the photo-taking sequence, the photo-taking optical system drive sequence, and the flash light emission sequence, which are generally needed, with the appropriate exposure calculating device (not shown).

Numeral 41' is a finder objective lens movement amount calculating device connected to the electric resistance plate 31' and the movement limit detection pattern 33. In the second embodiment, the calculating device arithmetically obtains a movement amount of the objective lens frame 15 from a reference position on the electric resistance plate 31' as an analog electric resistance value, different from that in the first embodiment. Also, a direction of movement of the objective lens frame may be determined using a direction of increase or decrease of the electric resistance value. In the second embodiment, the reference position is set for example at a position of the objective lens frame 15 corresponding to the infinite distance.

The calculating device 41' is structured to output a movement limit signal of the objective lens frame 15 based on an output from the finder objective lens movement limit detecting device 33, 34.

Numeral 42' is a first memory device in the second embodiment, which preliminarily stores a table of a relation between a movement amount x of the finder objective lens 12 and an electric resistance value $r_1-r_n$ corresponding to a plurality of subject distances preset within a range between the infinite distance and the closest distance. When a resistance value signal R is input from the finder objective lens movement amount calculating device 41' to the first memory device 42', the first memory device 42' outputs a movement amount x of the finder objective lens 12 (objective lens frame 15) corresponding to the input resistance value signal R to the finder objective lens movement amount calculating device 41'.

When the movement limit signal is input from the finder objective lens movement limit detecting device 33, 34 into the first memory device 42', the first memory device 42' outputs either a movement amount datum of the objective lens frame 15 corresponding to the infinite distance or a movement amount datum of the objective lens frame corresponding to the closest distance to the finder objective lens movement amount calculating device 41'.

Numeral 43' denotes a photo-taking optical system movement amount determining device connected to the finder objective lens movement amount calculating device 41', which cooperates with a second memory device 44' as below described to determine a focusing amount Y of the photo-taking optical system 4 (as well as the lens barrel 5) corresponding to a current subject distance.

Numeral 44' is a second memory device used in the second embodiment, which stores a table of the focusing amount Y of the photo-taking optical system 4 corresponding to the movement amount data x of the finder objective lens 12 corresponding to the plural subject distances preset within the range between the infinite distance and the closest distance. When a resistance value signal R is input from the finder objective lens movement amount calculating device 41' into the second memory device 44', the second memory device 44' outputs a focusing amount Y corresponding to the input resistance value signal R to the photo-taking optical system movement amount determining device 43'.

In this case, if the movement of the finder objective lens 12 is identical in style to that of the photo-taking optical system 4, there is a constant proportion relation between the resistance value signal R and the focusing amount Y. Therefore, by storing a proportion constant k in the second memory device 44′, the focusing amount Y of the photo-taking optical system 4 may be determined as $Y=kd_1$, $Y=kd_2,...,$ $Y=kd_{n-1}$, $Y=kd_n$.

The operation of the second embodiment thus arranged is explained in the following.

A user presses the power operation button 3 to turn the circuits of the camera into an operation state. Viewing through the finder eye piece 14, the user rotates the finder focusing dial 21 clockwise and moves the objective lens frame 15 (finder objective lens 12) located at a position corresponding to the infinite distance toward a subject, to form an image of the subject on the focusing screen 11.

When the finder focusing dial 21 is rotated clockwise, the control cam 24a′ of the finder focusing cam member 24′ simultaneously rotates clockwise so as to rotate clockwise the interlocking lever 25′ against the strong biasing force of the second biasing spring 27′.

Accordingly, the other end 25b′ of the interlocking lever 25′ presses the back face of the jaw 15a of the objective lens frame 15 to move the objective lens frame 15 toward the subject along the finder optical axis 0 against the biasing force of the first biasing spring 16.

The finder objective lens 12 moves with respect to the focusing screen 11, so that a sharp image of the target subject may be focused on the focusing screen 11 during the movement process of the objective lens frame 15.

During the movement process, the first slide brush 32′ mounted on the objective lens frame 15 slides on the electric resistance plate 31′ to stop at a position where a sharp image of the subject is focused on the focusing screen 11.

Step S41

If the user stops the operation of the finder focusing dial 21 and presses the shutter release button 9 at this stage, an operation is started to detect a movement amount x of the objective lens frame 15 from the reference position (the position corresponding to the infinite distance) as shown in the flowchart of FIG. 7. This operation is referred to as a movement amount detection operation.

Step S42

When the movement amount detection operation starts, a resistance value signal R according to a position where the objective lens frame 15 (first slide brush 32) stops is output from the finder objective lens movement amount detecting device 31′, 32′ to the finder objective lens movement amount calculating device 41′.

Step S43

It is judged in the finder objective lens movement amount calculating device 41′ whether the resistance value signal R is smaller than the first electric resistance value $r_1$, that is, whether $R<r_1$.

Steps S43 and S44

If the resistance value signal R according to the stop position of the objective lens frame 15 is not smaller than the first electric resistance value $r_1$, a movement amount $x=d_1$ of the objective lens frame 15 corresponding to the electric resistance value $r_1$ is read out from the table of the first memory device 42′ to the finder objective lens movement amount calculating device 41′. Then the movement amount detection operation is finished for the objective lens frame 15 with regard to the first electric resistance value $r_1$.

Steps S45 and S46

If the resistance value signal R according to the stop position of the objective lens frame 15 is smaller than the first electric resistance value $r_1$, it is judged whether the resistance value signal R is smaller than the second electric resistance value $r_2$, that is, whether $R<r_2$. If the resistance value signal R is not smaller than the second electric resistance value $r_2$, a movement amount $x=d_2$ of the objective lens frame 15 is read out from the table of the first memory device 42′ to the finder objective lens movement amount calculating device 41′. Then the movement amount detection operation is finished for the objective lens frame 15 with regard to the second electric resistance value $r_2$.

Steps S47 and S48

Similarly as in the first embodiment, until an electric resistance value, for example $r_{n-1}$, for the target subject and therefore a movement amount $x=d_{n-1}$ of the objective lens frame 15 corresponding thereto are obtained, the above steps are repeated up to Steps S47 and S48 to judge whether $R<r_{n-1}$ and to read a movement amount $x=d_{n-1}$ of the objective lens frame 15 corresponding thereto.

Step S50

It is judged at Step S47 whether the resistance value signal R according to the stop position of the objective lens frame 15 is smaller than the electric resistance value $r_{n-1}$. If the resistance value signal R is smaller than the electric resistance value $r_{n-1}$, the objective lens frame 15 must be located at the position corresponding to the closest distance. Then the finder objective lens movement amount calculating device 41′ deems that the objective lens frame 15 is located at the position corresponding to the closest distance, and reads a corresponding electric resistance value $r_n$ from the table of the first memory device 42′ to the finder objective lens movement amount calculating device 41′. The calculating device 41′ executes a reading operation of a movement amount $x=d_n$ of the objective lens frame 15 corresponding to the electric resistance value $r_n$.

The finder objective lens movement limit detecting device 33, 34 has the same movement limit function of the objective lens frame 15 as that in the first embodiment.

Once the movement amount x of the objective lens frame 15 is determined for a target subject with respect to the focusing screen 11, the total control section 40′ generates a command to drive the lens barrel 5 toward the devices of from the photo-taking optical system movement amount determining device 43′ to the photo-taking optical system driving device 48, similarly as in the first embodiment.

FIG. 8 is a flowchart to illustrate a focusing operation of the photo-taking optical system 4.

Step S51

When the total control section 40′ generates the command, the judging device 46 moves the lens barrel 5 (as well as the photo-taking optical system 4) through the photo-taking optical system drive control device 47 and the photo-taking optical system driving device 48 from the start position toward the subject.

Step S52

The total control section 40' simultaneously actuates the photo-taking optical system position detecting device 45 to make it detect a position of the lens barrel 5 along the photo-taking optical axis during the movement.

Step S53

During the movement process of the lens barrel 5, the photo-taking optical system movement amount determining device 43' reads, based on the movement amount $x = d_{n-1}$ (as will be referred to as a specific movement amount) of the objective lens frame 15 output from the finder objective lens movement amount calculating device 41', a focusing amount Y of the photo-taking optical system 4 corresponding to the specific movement amount $x = d_{n-1}$. It is judged at Step S53 whether the specific focusing amount Y is equal to the first focusing amount $kd_1$, that is, whether $Y = kd_1$.

Step S54

Since $d_{n-1} \neq kd_1$ in this case, the photo-taking optical system movement amount determining device 43' executes a judgement about whether the specific movement amount $x = d_{n-1}$ is equal to the second focusing amount $kd_2$, that is, about whether $Y = kd_2$.

Step S55

Since $d_{n-1} \neq kd_2$ in this case, either, the photo-taking optical system movement amount determining device 43' repeats similar judgements up to Step S55. It is judged at Step S55 whether the specific movement amount $x = d_{n-1}$ is equal to the $(n-1)$-th focusing amount $x = kd_{n-1}$, that is, whether $Y = kd_{n-1}$.

If it is judged that $Y = kd_{n-1}$, the photo-taking optical system movement amount determining device 43' reads out a focusing amount $Y = kd_{n-1}$ of the photo-taking optical system 4 from the table of the second memory device 44', and outputs it to the judging device as a focusing amount for the target subject.

Similarly as in the first embodiment, in case of the specific movement amount $x = d_{n-1}$, the specific movement amount $x = d_{n-1}$ is not compared with the remaining movement amount $x = d_n$ of the closest distance ($Y \neq kd_n$). Step S56 is absent in this case.

The judging device 46, which received the focusing amount $Y = kd_{n-1}$ from the photo-taking optical system movement amount determining device 43', drives the photo-taking optical system driving device 48 through the photo-taking optical system drive control device 47 similarly as in the first embodiment to move the lens barrel 5 by the focusing amount $Y = kd_{n-1}$ from the start position.

When the photo-taking optical system position detecting device 45, which is detecting a changing movement position of the lens barrel 5, detects that the movement amount of the lens barrel 5 reaches the focusing amount $Y = kd_{n-1}$ of the photo-taking optical system 4, the judging device 46 quickly stops the photo-taking optical system drive control device 47 through the photo-taking optical system driving device 48 at that moment.

Step S57

The lens barrel 5 stops after it moved by the desired focusing amount $Y = y_{n-1}$ accordingly. In other words, the photo-taking optical system is in focus on the target subject. Further, the subject distance may be read with the subject distance indication division 21a of the finder focusing dial 21 and with the reading index 22.

Steps S58 and S59

After the focusing operation of the lens barrel 5 is thus finished, the total control section 40' actuates the exposure control device 35 in accordance with the photo-taking sequence to open and close the shutter. When the exposure operation is finished, the total control section 40' operates the film feed device 36 to transfer a next frame non-photographed to the exposure opening position.

The completion of the next frame transfer operation concludes all the operations in the second embodiment.

Although the present invention was explained with reference to the embodiments illustrated, the present invention is not intended to be limited to the described embodiments. On the contrary, the present invention may be freely modified within a scope and spirit of the present invention.

For example, there is a difference in focusing operation type of the photo-taking optical system between the first and the second embodiments. It should be noted that the focusing operation mode of the first embodiment may be applied to the second embodiment, and vice versa.

Also, other techniques may be employed without limitation to the method as described, for using the detection value of the focusing position of the finder objective lens 12 (objective lens frame 15) for focusing of the photo-taking optical system 4.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera with a non-TTL type finder, comprising:
a finder focusing screen disposed in a finder optical system of the finder to form an image of a subject thereon;
a finder focusing optical member located closer to the subject than said finder focusing screen and constituting a part of the finder optical system;
finder focusing means for changing a position of the finder focusing optical member in a direction of an optical axis of the finder optical system relative to said finder focusing screen to focus the image of the subject on said finder focusing screen;
focused state detecting means for detecting the position of the finder focusing optical member in the direction of the optical axis of the finder optical system relative to the finder focusing screen;
a photo-taking optical system separately arranged from said finder optical system and being capable of focusing an image of the subject on a record medium;
photo-taking optical system focusing amount determining means for determining an amount of focusing of the photo-taking optical system in dependence on a detection value of said focused state detecting means; and photo-taking optical system driving means for driving said photo-taking optical system into an in-focus state in accordance with said amount of focusing determined by said photo-taking optical system focusing amount determining means.

2. A camera with a non-TTL type finder according to claim 1, wherein said finder focusing means moves said finder focusing optical member with respect to said finder focusing screen.

3. A camera with a non-TTL type finder according to claim 2, wherein said focused state detecting means comprises a comb focusing pattern having a plurality of teeth aligned at a predetermined pitch along the finder optical axis, an earth pattern disposed to oppose said focusing pattern, a slide terminal disposed movable with the optical member along said finder optical axis to connect the plural teeth of the focusing pattern in sequence with said earth pattern, and connection position detecting means for detecting a tooth of the focusing pattern connected with said earth pattern.

4. A camera with a non-TTL type finder according to claim 2, wherein said focused state detecting means comprises an electric resistance plate disposed along said finder optical axis, a slide terminal disposed movable along said finder optical axis, and focusing resistance value detecting means for detecting a resistance value of said electric resistance plate determined by a position of the slide terminal.

5. A camera with a non-TTL type finder according to claim 1, wherein said finder focusing means moves said finder focusing optical member within a predetermined range along the finder optical axis.

6. A camera with a non-TTL type finder according to claim 5, wherein said predetermined range is defined by two ends respectively corresponding to an infinite distance and to a closest distance.

7. A camera with a non-TTL type finder according to claim 6, wherein said focused state detecting means has both end detecting means for detecting the both ends of the predetermined range.

8. A camera with a non-TTL type finder according to claim 7, wherein said both end detecting means comprises an infinite limit display pattern defining a movement limit position on an infinite distance side and a closest limit display pattern defining a movement limit position on a closest distance side.

9. A camera with a non-TTL type finder according to claim 1, wherein said finder focusing means comprises an operation member of dial manually operated, a cam member set as arranged to change a lift amount depending upon a rotation amount of said operation member, an interlocking member changing a rotation angle in accordance with the lift amount of the cam member, an optical system holding member holding said finder focusing optical member and moving said finder focusing optical member in a predetermined direction from a reference position along said finder optical axis in synchronism with said interlocking member, and a biasing member to bias the optical system holding member in a reverse direction to said predetermined direction.

10. A camera with a non-TTL type finder according to claim 9, wherein the lift amount of said cam member is a minimum for the infinite distance while a maximum for the closest distance.

11. A camera with a non-TTL type finder according to claim 9, wherein the lift amount of said cam member is a maximum for the infinite distance while a minimum for the closest distance.

12. A camera with a non-TTL type finder according to claim 9, wherein said interlocking member is an interlocking lever rotatably journalled, one end of which is engaged with said cam member, and the other end of which is engaged with the optical system holding member.

13. A camera with a non-TTL type finder according to claim 12, wherein said interlocking lever is urged by a spring to maintain said engagement of the ends.

14. A camera with a non-TTL type finder according to claim 1, wherein said photo-taking optical system driving means starts driving the photo-taking optical system by a shutter release operation after the photo-taking optical system focusing amount determining means has determined the focusing amount of the photo-taking optical system.

* * * * *